(12) United States Patent
Huang et al.

(10) Patent No.: US 9,492,994 B2
(45) Date of Patent: Nov. 15, 2016

(54) DEVICE HAVING MULTIPLE PRINTING LAYERS AND A PRINTING METHOD THEREOF

(71) Applicants: Wen-Fu Huang, Zhongli (TW);
Yin-Miao Lin, Taipei (TW);
Meng-Hsueh Wu, Taipei (TW);
Chen-Hui Cheng, Taipei (TW)

(72) Inventors: Wen-Fu Huang, Zhongli (TW);
Yin-Miao Lin, Taipei (TW);
Meng-Hsueh Wu, Taipei (TW);
Chen-Hui Cheng, Taipei (TW)

(73) Assignee: TPK Touch Solutions Inc., Taipei (TW)

( * ) Notice: Subject to any disclaimer, the term of this patent is extended or adjusted under 35 U.S.C. 154(b) by 197 days.

(21) Appl. No.: 13/623,121

(22) Filed: Sep. 20, 2012

(65) Prior Publication Data

US 2014/0079917 A1 Mar. 20, 2014

(51) Int. Cl.
*B32B 38/00* (2006.01)
*G06F 3/041* (2006.01)

(52) U.S. Cl.
CPC ............. *B32B 38/145* (2013.01); *G06F 3/041* (2013.01); *B32B 2309/105* (2013.01); *B32B 2457/208* (2013.01); *G06F 2203/04103* (2013.01); *Y10T 428/24752* (2015.01)

(58) Field of Classification Search
None
See application file for complete search history.

(56) References Cited

U.S. PATENT DOCUMENTS

| 8,018,558 B2* | 9/2011 | Kubota et al. ................ 349/122 |
| 8,686,965 B2* | 4/2014 | Mi ................. 345/174 |
| 2005/0146516 A1* | 7/2005 | Nishiyama .................... 345/176 |
| 2010/0245705 A1* | 9/2010 | Nakagawa et al. ............ 349/58 |
| 2012/0040113 A1* | 2/2012 | Sato et al. .................. 428/34.1 |

FOREIGN PATENT DOCUMENTS

| CN | 101539679 | 9/2009 |
| CN | 102141865 | 8/2011 |
| TW | 381520 | 6/2010 |
| WO | WO 2010122964 A1 * | 10/2010 |

* cited by examiner

*Primary Examiner* — David Sample
*Assistant Examiner* — Laura C Powers
(74) *Attorney, Agent, or Firm* — Goklap Bayramoglu; Paul Bendemire

(57) ABSTRACT

The present disclosure discloses a device having multiple printing layers and a printing method thereof, wherein said method comprises: seriatim stack-printing at least one printing layer on a protective substrate in an ascending order of size, wherein the protective substrate has an open surface exposed outward and a laminating surface laminated with a plate, and wherein the printing layer is printed on a part of the laminating surface and the closer the printing layer is to the laminating surface, the smaller area the printing layer has so as to reduce height difference between printing layers and make for the following lamination.

13 Claims, 4 Drawing Sheets

DEVICE HAVING MULTIPLE PRINTING LAYERS AND A PRINTING METHOD THEREOF

BACKGROUND OF THE INVENTION

This Application claims the benefit of the People's Republic of China Application No. 201110385138.4, filed on Nov. 28, 2011.

FIELD OF THE INVENTION

The present disclosure relates to a device having a printing layer. More particularly, the present disclosure relates to a device having multiple printing layers and a printing method thereof.

DESCRIPTION OF THE RELATED ART

With the popularity of smart phones and tablet PCs, demand for touch panels in the applications of handheld electronic devices is exceeding supply. As a result, the whole industry is continually researching and improving related technology to reduce production cost and provide higher production capacity.

In general, touch panels are required to be added with a layer of cover glass/lens that has to be strengthened for protecting a touch sensor on a lower layer thereof against impacts of scuffing, fingerprints and defiling. Moreover, since a cover glass especially needs to be used on handheld electronic devices for touch and display functions, it should have characteristics of light-weight, compression resistance, fall resistance, and high transmittance etc.

Traditionally, each component in the handheld electronic device such as display panel, touch panel, and cover glass is assembled through a border. However, with increasing demand for light-weight and compact handheld electronic devices, especially smart phones, current industry has massively utilized non-border appearance design for further lessening overall weight and size of electronic devices by omitting border components.

With the foregoing non-border design, lamination of the cover glass and touch panel on lower layer is a key technology, wherein effect of lamination impacts yield of final finished-products. FIG. 1 shows a vertical view diagram of a non-border appearance of a traditional smart phone. Designers generally create an impression of border on the appearance of electronic devices for design requirement of overall shape and color collocation. Such a design is created by using a printing ink to print a layer of predetermined frame pattern 110 on a cover glass 100 at first, and then laminating the Whole cover glass 100 with a surface that has been printed with a frame pattern to a touch panel (not shown). Accordingly, a transparent area that has not been printed with a frame pattern on the cover glass 100 is used as a touch area 101, and the frame pattern 110 helps finished-products to bring a design impression that designer has designed for users.

FIG. 2 is a partial section view diagram of a liquid crystal display device in tradition. FIG. 2 shows a panel 200 that has been printed with printing layers 210 being laminated on a plate 220 (upper polarizer). FIG. 2 shows a printing layer 210 (ink layer) printed on the panel 200 in advance as a frame pattern, wherein the panel 200 is laminated with the plate 220 through an adhesive layer 230. In this embodiment, since a printing layer 210 is standing between the panel 200 and the plate 220, yield of the lamination process can not be easily controlled because of the height difference between each printing layer 210 when laminating. In order to change the design and make color O.D value (optical density) of frame pattern better, multiple printing layers are required to be stack-printed on the substrate. As shown in FIG. 2, four different printing layers 210 are stack-printed on the panel 200 in a descending order of size. In practice, the more printing layers there are in the frame patterns, the more apparent the height difference between layers will be, and the more difficult it is to control the lamination process to reach a certain precision. Furthermore, during the process of laminating the panel and the printing layer that is printed by stack-printing on the panel described above, apparent projecting points appear at the junction of each two printing layers because of ink-accumulation, thereby increasing average height difference of printing layer structures and damaging predetermined frame pattern.

Consequently, in order to improve laminating yield of cover glass of touch panel, there exists a need for a new printing technology and a laminating technique for solving the problems that exist in the foregoing known technology.

SUMMARY OF THE INVENTION

In view of defects in the foregoing technology, an object of the present disclosure is to provide a device having multiple printing layers. In an embodiment, the multiple printing layers are seriatim stack-printed on a laminating surface of a protective substrate in an ascending order of size. The proposed process can manufacture a protective substrate with less height difference of printing layers so as to increase yield of the following lamination process and improve color O.D value (optical density) of a frame pattern.

Another object of the present disclosure is to provide a method of printing multiple printing layers. Height difference between printing layers that are printed by the method is relatively less, which is contributive to improving yield of the following lamination process.

According to one embodiment of the present disclosure, a device having multiple printing layers comprises a protective substrate having an open surface exposed outward and a laminating surface required to be laminated with a plate; and at least one printing layer seriatim stack-printed on a part of the laminating surface of said protective substrate, wherein the closer the printing layer is to the laminating surface the smaller area the printing layer has.

According to another embodiment of the present disclosure, a method of printing multiple printing layers comprises seriatim stack-printing at least one printing layer on a part of a laminating surface of a protective substrate in an ascending order of size, wherein the protective substrate has an open surface exposed outward and the laminating surface for laminating with a plate, and the printing layer is printed on a part of the laminating surface and the closer the printing layer is to the laminating surface, the smaller area the printing layer has.

The printing layers that are designed to stack from small size to large size can efficiently reduce height difference between printing layers, and it is good for following lamination with the plate.

The present disclosure would now be illustrated with following embodiments and drawings.

BRIEF DESCRIPTION OF THE DRAWINGS

For those skilled in the art to understand the present disclosure, numerous embodiments accompanied with drawings are described below and formed part of the specification. Annexing drawings minutely illustrate the matters of the present disclosure and the purpose thereof. In the drawings.

DETAILED DESCRIPTION OF THE EMBODIMENTS

Figure 3:
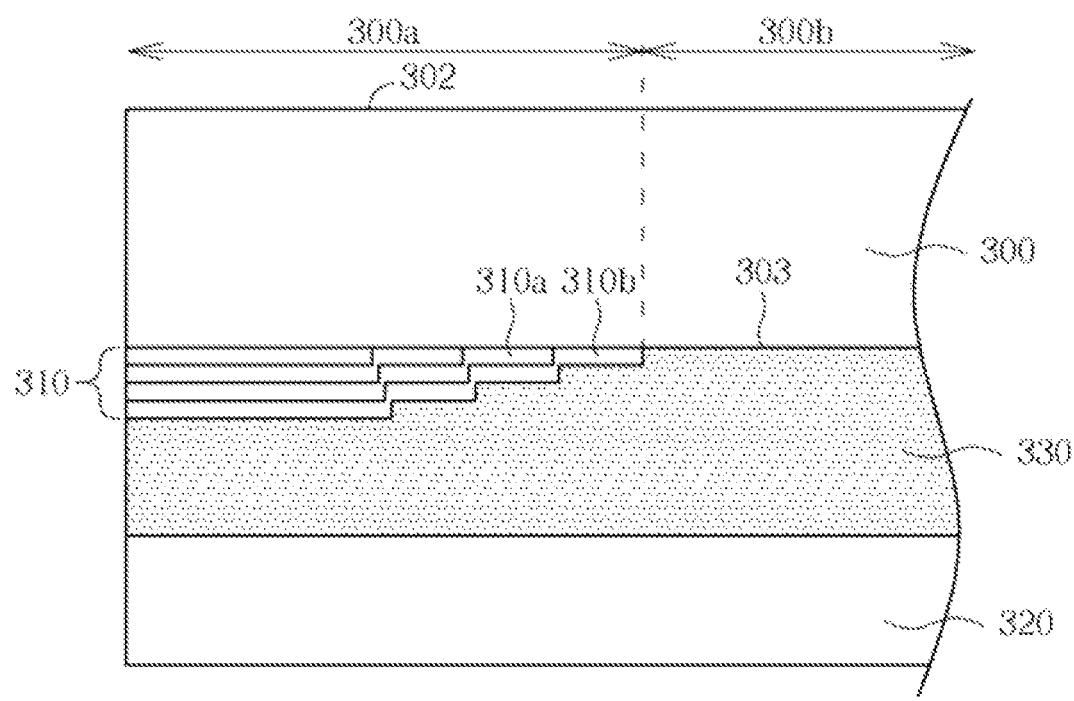
FIG. 3 is a section view diagram of a device having multiple printing layers in accordance with embodiments of the present disclosure.

FIG. 3 illustrates a section view diagram of a device having multiple printing layers in accordance with embodiments of the present disclosure. FIG. 3 shows a state of a protective substrate 300 being laminated on a plate 320 (for example, an upper polarizer) in a display panel. In this embodiment, the protective substrate 300 is provided as a protective layer for protecting said plate 320 underneath, such as a touch substrate having a touch sensing layer or an upper polarizer of display panel. Material of the protective substrate 300 can be a transparent glass such as a cover glass or plastic. As shown in FIG. 3, the protective substrate 300 can be divided into a peripheral area 300a and a non-peripheral area 300b, which is surrounded by the peripheral area 300a. The peripheral area 300a can be a pattern area, which is printed with an opaque ink pattern for defining border of the device or endowing the device with changes of colors for design. The non-peripheral area 300b is a touch area for the whole substrate, which has not been printed with any patterns for showing images and information to users. The protective substrate 300 has an open surface 302 exposed outward, and has a laminating surface 303 required to be laminated with the plate 320. The open surface 302 is exposed to outside of device after the protective substrate 300 has been laminated and assembled, and the laminating surface 303 is stack-disposed with multiple printing layers 310 on it.

In an embodiment, the multiple printing layers 310 can be ink layers and can be seriatim printed on the peripheral area 300a of the laminating surface 303 of said protective substrate 300 in an ascending order of size by a method of stack-printing. An area upon the non-peripheral area 300h of the open surface 302 is a touch area for users to perform line drawing or clicking actions by fingers or stylus for achieving an effect of controlling. During the process of lamination, the protective substrate 300 is overall laminated with the plate 320 underneath through an adhesive layer 330. In an embodiment, the protective substrate 300 further comprises a touch sensing layer disposed on the non-peripheral area 300b of the laminating surface 303 of said protective substrate 300, namely touch area, thereby forming a touch panel integrated with touch functions on the protective substrate to be laminated with the plate 320 underneath such as upper polarizer in the display panel through an adhesive layer 330 in the process of lamination.

Figure 4:
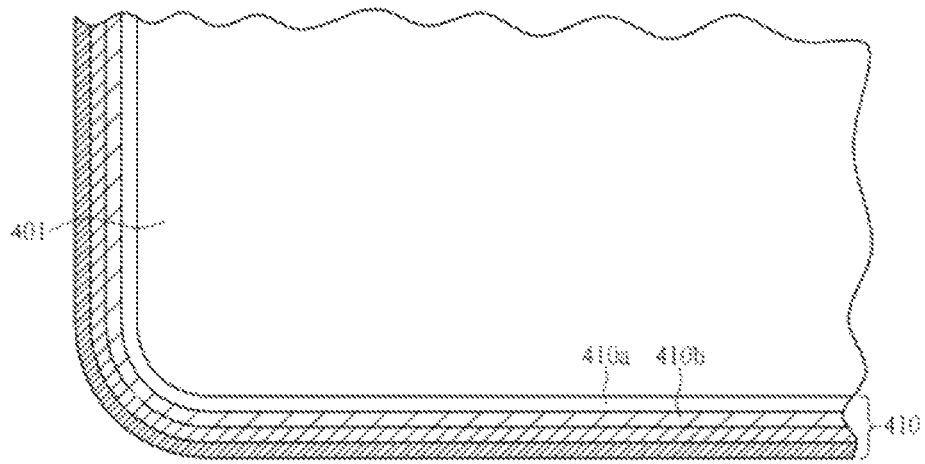
FIG. 4 is a partial vertical view diagram of multiple printing layers on a protective substrate after they are practically laminated with a plate in accordance with embodiments of the present disclosure.

FIG. 4 illustrates a partial vertical view diagram of multiple printing layers on a protective substrate after they are laminated with a plate in accordance with embodiments of the present disclosure. As shown, stacked printing layers 410 appear as a border from an angle of open surface of the protective substrate 300, wherein for printing layers 410, an area with more stacking layers, such as area 410b which comprises two stacking layers, appear as darker and higher color density with compared to an area with less stacking layers, such as area 410a having only one stacking layer. Further, O.D value (optical density) of such an area 410b is also higher.

In an embodiment, an edge area that is closer to printing layers having more stacking layers has a thicker color. Further, touch area 401 is a central transparent area that has not been printed with any printing layers. It would be appreciated that the printing layers can appear in a distribution state of color layer that is different from the state of the present disclosure as dark interior and light exterior, and can therefore have a light exterior and dark interior or irregular distribution states of color layer. Also, configuration changes as to how the color is to be distributed can be made contingent on designer's design. Designer can design a colorful frame pattern with pattern changes on the surface of the substrate by controlling stacking disposition and distribution of the printing layers.

Figure 1:
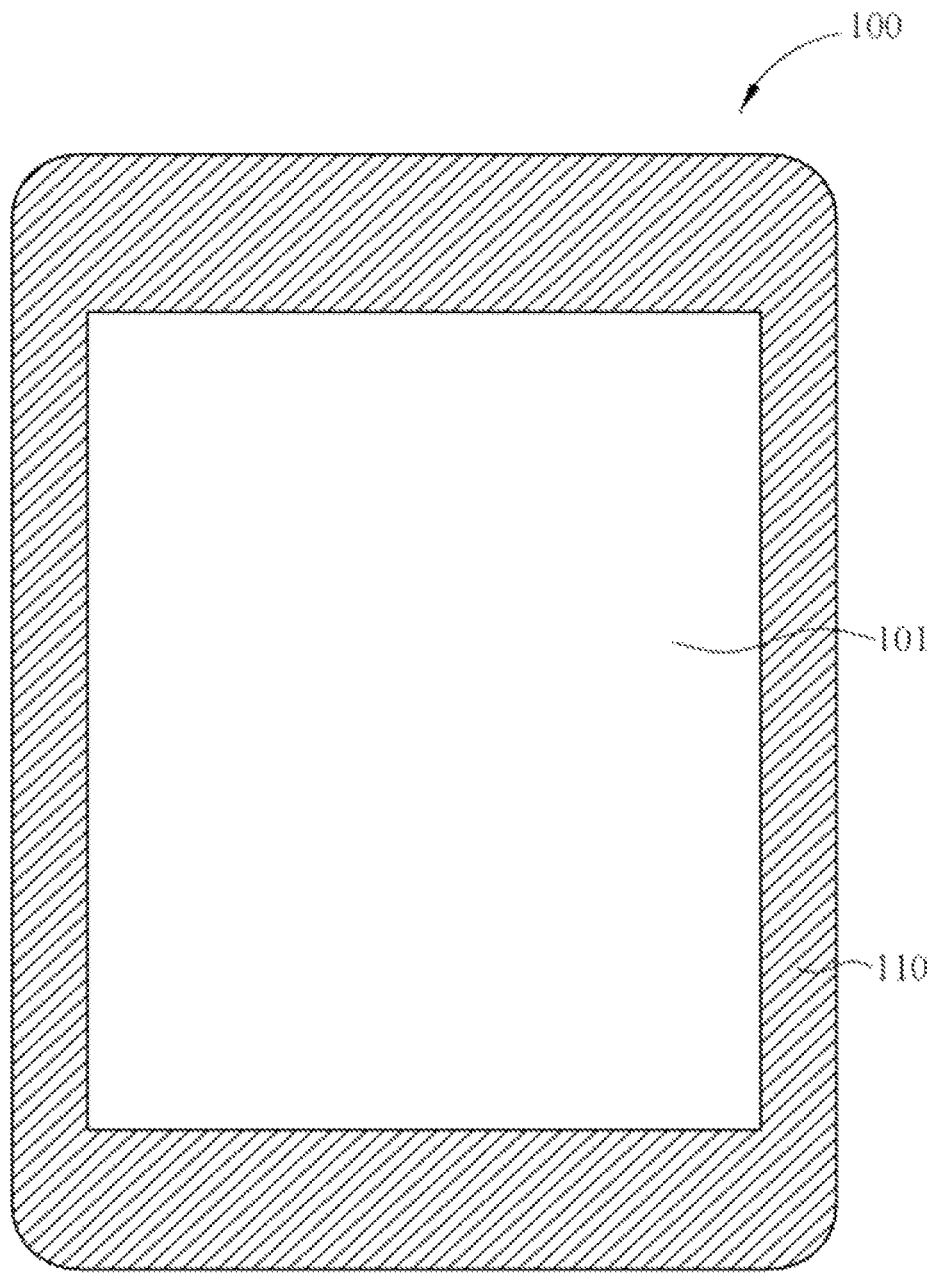
FIG. 1 is a vertical view diagram of a traditional smart phone.
Figure 2:
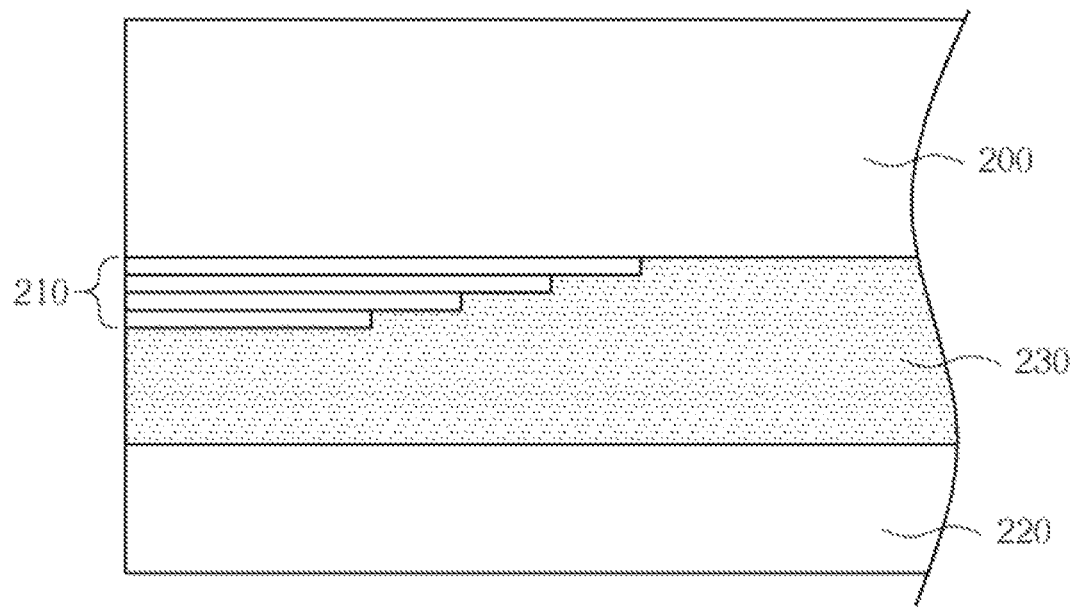
FIG. 2 is a partial section view diagram of a liquid crystal display device in tradition.

A characteristic of the present disclosure is that multiple printing layers disposed on the protective substrate are seriatim printed on the laminating surface of the substrate in an ascending order of size, which is opposite to the traditional method of stack-printing in a descending order of size. Considering the present disclosure, with reference to FIG. 3, by the way of printing smaller size of printing layer such as 310a first during the printing period, the following printing layer such as 310b can be printed based on the previous printing layer so that the larger size of printing layer printed later can be distributed on the surface of the previous printing layer. Therefore, the gradient of the printing layers tends to be gentle and it can avoid appearing big height difference as shown in FIG. 2 or projecting points.

Figure 5:
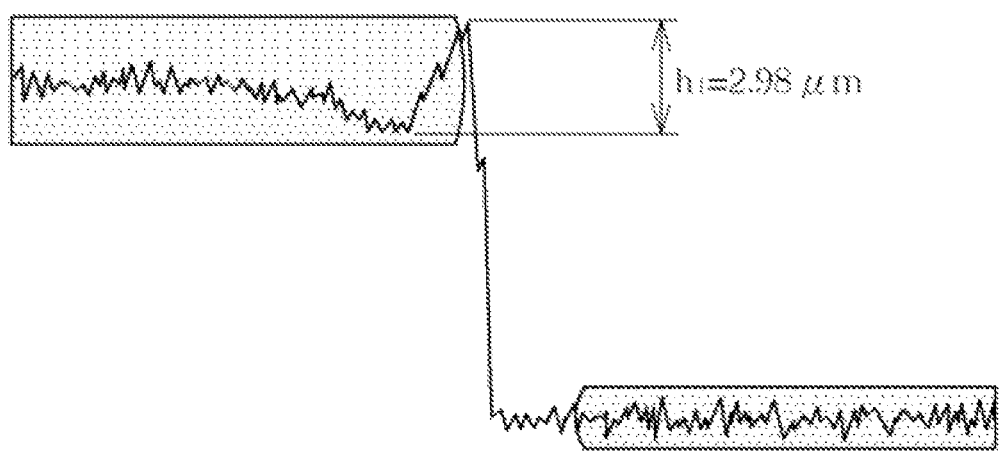
FIG. 5 illustrates height difference of printing layers printed by a method of stack-printing from a large site to a small size in accordance with tradition technology.
Figure 6:
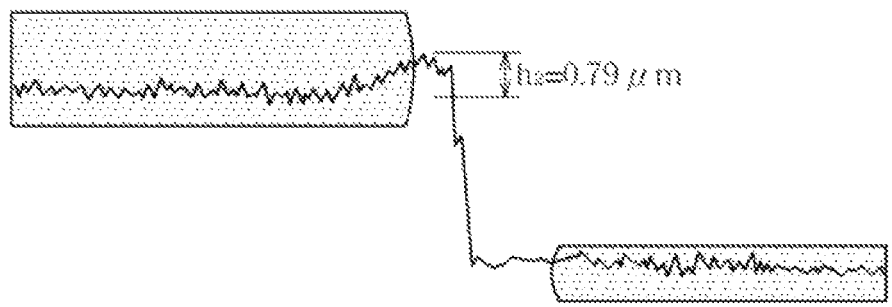
FIG. 6 illustrates height difference of printing layers printed by a method of stack-punting from a small size to a large size in accordance with the present disclosure.

FIG. 5 illustrates distributing diagrams of height difference of printing layers printed by a method of stack-printing from a large size to a small size in tradition. FIG. 6, on the other hand, illustrates a method of stack-printing from a small size to a large size in accordance with the present disclosure. Based on the comparison shown through FIG. 5 with FIG. 6, the structure of printing layers formed by a method of stack-printing in tradition has a larger height difference of 2.98 μm between layers. In contrast, the structure of printing layers formed by the method of the present disclosure has relatively smaller height difference of 0.79 μm between layers. Moreover, gradient between layers of stacking structure printed by the method of tradition is relatively sharp, and gradient between layers of stacking structure printed by the method of the present disclosure, on the other hand, is relatively gentle. Consequently, the protective substrate with patterns of the printing layer by the printing method of the present disclosure has a better yield performance in the following laminating technique.

Figure 7:
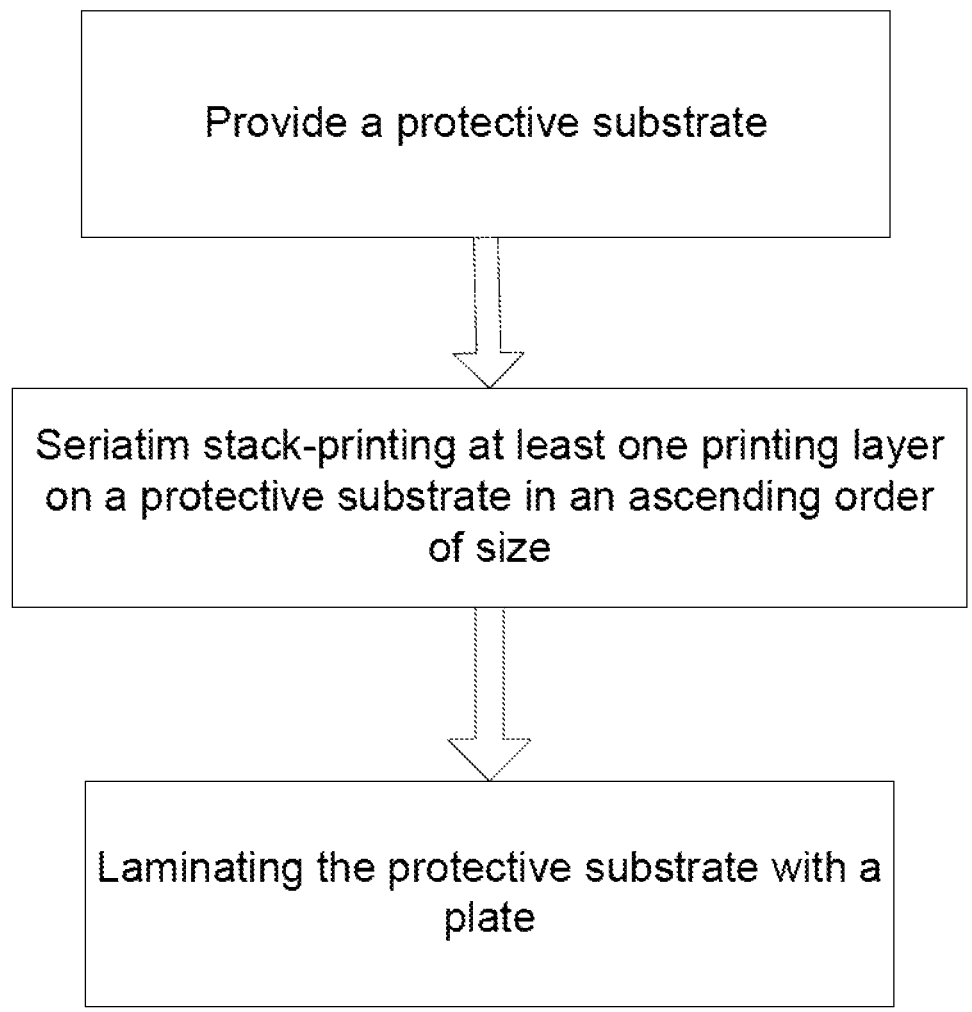
FIG. 7 is a flow chart of a method of printing multiple printing layers in accordance with embodiments of the present disclosure.

FIG. 7 illustrates a flow chart 700 of a method of printing multiple printing layers in accordance with embodiments of the present disclosure. In step block 701, a protective substrate is provided as a protective component for a plate on a lower layer. The protective substrate has an open surface exposed outward and a laminating surface required to be laminated with a plate. Material thereof can be transparent glass or plastic with characteristics of being light-weight, resistant to compaction, resistant to fall, and high transmittance. In a step block 702, at least one printing layer is seriatim stack-printed on a part of the laminating surface of the protective substrate in an ascending order of size, wherein said printing layer is a frame pattern for distinguishing with a transparent touch area of the protective substrate.

In a further embodiment of the present disclosure, as shown in a step block 703, the protective substrate with multiple printing layers can further be laminated with a plate after being printed with said printing layer. The laminating step can be performed by a method of laminating the plate with the protective substrate after the plate has been coated with a layer of adhesive on. The stacked multiple printing layers are seen as a border from the angle of opening surface of the substrate after being laminated.

The foregoing descriptions are the preferable embodiments of the present disclosure only, but are not limitations. Various modifications can be made thereto without departing from the spirit and scope of the disclosure. All modifications and substitutions to the claims of the present disclosure are defined by the attached claims.

What is claimed is:

1. A device having multiple printing layers, comprising:
    a protective substrate having an open surface exposed outward and a laminating surface, wherein the laminating surface is divided into a peripheral area and a non-peripheral area, the non-peripheral area is surrounded by the peripheral area; and
    multiple opaque printing layers are printed as a frame pattern on the peripheral area of the protective substrate, the multiple opaque printing layers are seriatim stack-printed on the peripheral area of the laminating surface of the protective substrate in an ascending order of size, wherein the closer the multiple opaque printing layers are to the laminating surface, the smaller the area the multiple opaque printing layers have; and
    wherein a touch sensing layer is disposed on the non-peripheral area of the laminating surface of the protective substrate.

2. The device having multiple printing layers of claim 1, wherein said protective substrate is a cover glass.

3. The device having multiple printing layers of claim 1, further comprising:
    a plate, laminated with the laminating surface of the protective substrate;
    wherein
    the multiple opaque printing layers are interposed between the plate and the protective substrate.

4. The device having multiple printing layers of claim 1, wherein the multiple opaque printing layers are ink layers.

5. A method of printing multiple printing layers, comprising:
    providing a protective substrate having an open surface exposed outward and a laminating surface, wherein the laminating surface is divided into a peripheral area and a non-peripheral area, the non-peripheral area is surrounded by the peripheral area;
    printing multiple opaque printing layers as a frame pattern on the peripheral area of the protective substrate, and seriatim stack-printing the multiple printing layers on the peripheral area of the protective substrate in an ascending order of size wherein the closer the multiple printing layers are to the laminating surface, the smaller the area the multiple opaque printing layers have; and
    forming a touch sensing layer on the non-peripheral area of the laminating surface of the protective substrate.

6. The method of printing multiple printing layers of claim 5, wherein said protective substrate is a cover glass.

7. The method of printing multiple printing layers of claim 5, further comprising laminating a plate with the laminating surface of the protective substrate; wherein the plate is a polarizer disposed on an upper surface of a display panel, wherein the multiple opaque printing layers are interposed between the polarizer and the protective substrate.

8. The device having multiple printing layers of claim 1, further comprising:
    a plate, laminated with the laminating surface of the protective substrate,
    wherein said plate is a polarizer disposed on an upper surface of a display panel;
    wherein the multiple opaque printing layers are interposed between the polarizer and the protective substrate.

9. The device having multiple printing layers of claim 1, wherein the multiple opaque printing layers comprise:
    a first opaque printing layer, formed on the laminating surface of the protective substrate; and
    a second opaque printing layer, formed on the first opaque printing layer and the laminating surface of the protective substrate, wherein the area of the first opaque printing layer is smaller than the area of the second opaque printing layer.

10. The device having multiple printing layers of claim 9, wherein an upper surface of the first opaque printed layer is in contact with the laminating surface of the protective substrate, and wherein the second opaque printing layer covers a bottom surface and a lateral surface of the first printing opaque layer.

11. The device having multiple printing layers of claim 1, wherein the multiple opaque printing layers have high optical density value.

12. The device having multiple printing layers of claim 1, wherein the multiple opaque printing layers comprise:
    a first opaque printing layer, formed on the laminating surface of the protective substrate;
    a second opaque printing layer, formed on the first opaque printing layer and the laminating surface of the protective substrate, wherein the area of the first opaque printing layer is smaller than the area of the second opaque printing layer; and
    a third opaque printing layer, formed on the second opaque printing layer and the laminating surface of the protective substrate, wherein the area of the second opaque printing layer is smaller than the area of the third opaque printing layer.

13. The device having multiple printing layers of claim 12, wherein an upper surface of the first opaque printed layer is in contact with the laminating surface of the protective substrate, the second opaque printing layer covering a bottom surface and a lateral surface of the first printing opaque layer, the third opaque printing layer covering a bottom surface and a lateral surface of the second printing opaque layer.

* * * * *